(12) United States Patent
Jen et al.

(10) Patent No.: US 6,405,277 B1
(45) Date of Patent: Jun. 11, 2002

(54) METHOD AND SYSTEM FOR WRITING DATA TO A MAGNETIC STORAGE DEVICE IN A RELATIVELY COLD OR HOT ENVIRONMENT

(75) Inventors: David H. Jen; Daniel James Malone, both of San Jose; Jay Michael Mosbrucker, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,622

(22) Filed: Nov. 6, 1998

(51) Int. Cl.⁷ .............................................. G06F 12/00
(52) U.S. Cl. ............................................. 711/4; 360/75
(58) Field of Search ................................ 711/4; 360/75

(56) References Cited

U.S. PATENT DOCUMENTS

| | | | | |
|---|---|---|---|---|
| 4,802,154 A | * | 1/1989 | Verboom et al. | 369/59 |
| 5,392,273 A | * | 2/1995 | Masaki et al. | 369/106 |
| 5,408,365 A | * | 4/1995 | Doorn et al. | 360/46 |
| 6,078,455 A | * | 6/2000 | Enarson et al. | 360/68 |

FOREIGN PATENT DOCUMENTS

| | | | | |
|---|---|---|---|---|
| JP | 62-229571 | 10/1987 | ........... | G11B/19/02 |
| JP | 63-007562 | 1/1988 | ........... | G11B/19/02 |
| JP | 63-313348 | 12/1988 | ........... | G11B/19/02 |
| JP | 63-313349 | 12/1988 | ........... | G11B/19/02 |
| JP | 63-313390 | 12/1988 | ........... | G11B/33/14 |
| JP | 01-143069 | 6/1989 | ......... | G11B/17/028 |
| JP | 03-252961 | 11/1991 | ........... | G11B/19/02 |
| JP | 05-234237 | 9/1993 | ........... | G11B/19/02 |
| JP | 06-139687 | 5/1994 | ........... | G11B/19/02 |
| JP | 09-245419 | 9/1997 | ........... | G11B/19/04 |

* cited by examiner

Primary Examiner—Hiep T. Nguyen
(74) Attorney, Agent, or Firm—Robert O. Guillot; IPLO Intellectual Property Law Offices

(57) ABSTRACT

A method is described for storing data on a target track of a recordable medium in a storage device via a magnetic write head therein. The storage device has an operating parameter having an operational range with extreme at which the writing of data to said device is prohibited. A first threshold within said range is defined and proximate said first extreme and delimits a first operational subrange. The method including the steps of: monitoring said operating parameter; and determining whether the monitored parameter lies within said first subrange and if so, performing a first predetermined operation to compensate for deleterious effects on data storage caused thereby.

36 Claims, 10 Drawing Sheets

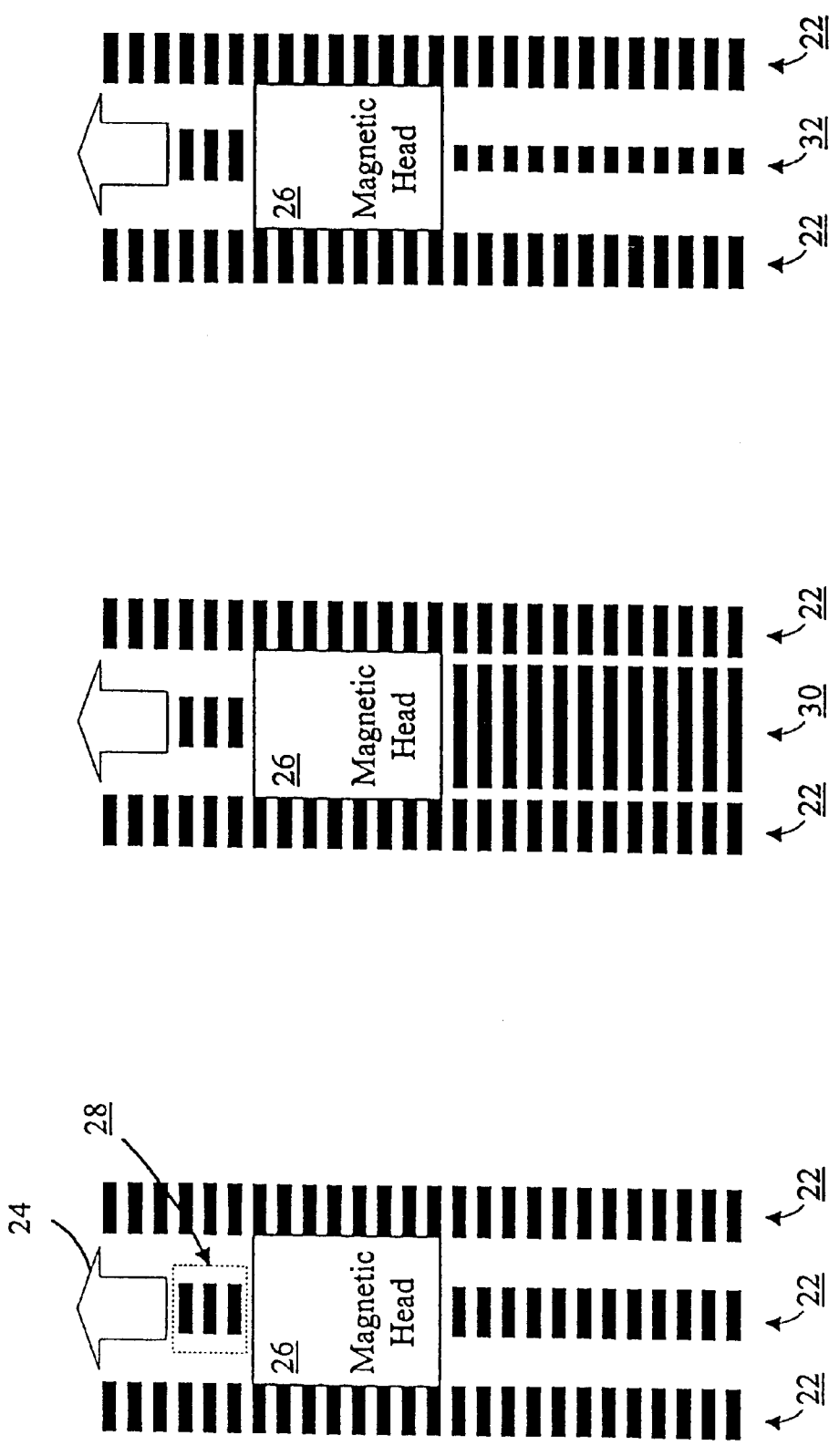

METHOD AND SYSTEM FOR WRITING DATA TO A MAGNETIC STORAGE DEVICE IN A RELATIVELY COLD OR HOT ENVIRONMENT

BACKGROUND OF THE INVENTION

1. Field of the Invention

This invention relates generally to magnetic storage device operation and more particularly to a method and system for writing data to a magnetic storage device when the device ambient temperature is relatively cold or hot.

2. Description of the Prior Art

A common concern for saving data onto a magnetic storage device is the reliability of the write operation when performed at the extremes of the temperature specification. While the read operation works well under these extreme circumstances, the write process may result in unrecoverable hard errors when attempts are made to read the data on either the target block or blocks adjacent to the target block.

One source of the problems at the temperature extremes is the coercivity of the storage media, for instance, a magnetic disk or tape. The disk coercivity changes with temperature. In a cold-temperature environment, the disk coercivity is high, whereas in a warm-temperature environment, the disk coercivity is low. Hence, at the low temperatures the disk is more difficult to write; and at the warm temperatures, there is the potential of writing an extra wide track resulting in adjacent track squeeze. Therefore, on the one hand, when the disk coercivity is high in a low-temperature environment, the question is whether or not data will be saved onto the media and, if the data are saved, whether or not the data saved can be retrieved successfully. On the other hand, when the disk coercivity is low in a high-temperature environment, the question is whether or not the tracks adjacent to the target track still contain their original data after the write operation.

FIG. 1A is a diagram illustrating the effect of disk coercivity on the written data bit width (track width) when the device is operating at a normal ambient temperature. A magnetic recording head 10 is shown flying above a magnetic disk 12. Magnetic field 14 is generated by the recording head 10 when the head 10 is writing to the disk 12 and saves a recorded magnet (data bit) 16 on the disk media 12. The width of recorded magnet 16 stays within a particular range when the recording head writes to the disk 12 so long as the device ambient temperature is within a normal operating temperature range.

However, as depicted in FIG. 1B, the disk coercivity is lower when the device ambient temperature is warmer, and the recorded magnets 18 saved on the disk media under this circumstance are wider than the recorded magnets 16 written to the disk media under the normal operating temperature as shown in FIG. 1A.

Similarly, as illustrated in FIG. 1C, the disk coercivity is higher when the device ambient temperature is cooler, and the recorded magnets 20 stored on the disk media under this circumstance are narrower than the recorded magnets 16 saved onto the disk media under the normal operating temperature as shown in FIG. 1A.

FIGS. 2A through 2C are plan view diagrams showing the widths of the tracks written onto a disk under the various temperature regimes illustrated in FIGS. 1A through 1C. As shown in these diagrams, as the widths of the recorded magnetic data bits formed on the media change under different temperatures so do the track widths. FIG. 2A indicates three data tracks 22 each written under normal operating temperature. An arrow 24 shows the direction of magnetic head movement. Previously recorded data bits 28 are being written over with data to be saved in the current write operation. FIG. 2B shows a middle track 30 written at a higher temperature than the two surrounding tracks 22 which were written at normal operating temperature. As expected, the widths of the magnetic data bits in the middle track 30 are wider than those of the tracks written under normal operating temperatures. As a result, a track written under higher temperature may squeeze into its adjacent tracks and may destroy the data previously recorded thereon. For a save operation performed at a hot temperature, the newly saved information in the middle track 30 may interfere with previously written adjacent tracks 22. Hence, this may cause unrecoverable hard errors when attempts are made to read the adjacent tracks 22 at a later time.

On the other hand, as shown in FIG. 2C, the width of the magnetic data bits in the middle track 32 were recorded at a cooler temperature resulting in a track which may be too narrow to be successfully read back. For a write operation performed at a cold temperature, the magnetic storage media may be so poorly written that the track cannot be properly read back. This may cause an unrecoverable read error when one attempts to read the data in the track at a later time.

Hence, a write operation to a magnetic disk works best when the device ambient temperature is within its normal operating temperature range. Conversely, a recording to a particular track performed at a temperature remote from the normal operating temperature may result in unrecoverable hard errors in a subsequent read operation attempted at the track or tracks adjacent to it. Data written to the track or in the adjacent tracks may never be properly read back. Therefore, it is desirable that the magnetic storage device ambient temperature be monitored before saving the data to the storage media and that data saved on the media be verified before completing the operation.

SUMMARY OF THE INVENTION

One object of the present invention is to provide a method and apparatus to insure that data saved onto a magnetic storage device are properly saved for future retrieval.

Another object of the present invention is to provide a method and apparatus to verify that data to be saved on a target track of a magnetic storage device are saved when the ambient temperature of the storage device is colder than normal operating temperature.

Yet another object of the present invention is to provide a method and apparatus to insure that data saved on a magnetic storage device when the ambient temperature of the storage device is within a predetermined range are verified before the save operation is complete.

One other object of the present invention is to provide a method and apparatus to insure that data in a tracks adjacent to a target track are unaffected by a write operation to the device when the device ambient temperature is warmer than normal operating temperature.

Briefly, the preferred embodiment includes a method for storing data on a target track of a recordable medium in a storage device via a magnetic head therein, said storage device has an operating parameter having an operational range with one extreme at which the writing of data to said device is prohibited. A first threshold within said range is defined and proximate said first extreme and delimits a first operational subrange. The method includes the steps of: monitoring said operating parameter; and determining whether the monitored parameter lies within said first subrange and if so, performing a first predetermined operation to compensate for deleterious effects on data storage caused thereby.

Another embodiment comprises a computer program product embodying a program of instructions executable by a machine to perform method steps for storing data on a target track of a recordable medium in a storage device via a magnetic write head. The storage device has an operating parameter having an operational range with one extreme at which the writing of data to said device is prohibited. A first threshold within said range is defined and proximate said first extreme and delimits a first operational subrange. The computer program product is operative to execute a method comprising the steps of: monitoring said operating parameter; and determining whether the monitored parameter lies within said first subrange and if so, performing a first predetermined operation to compensate for deleterious effects on data storage caused thereby.

Yet another embodiment includes a disk drive system having a magnetic storage medium for storing data in a storage device, wherein the head and storage medium are packaged in an enclosure. The system includes a controller for interfacing with an external system and controlling operation of the system; an actuator driver electrically coupled to said controller for positioning said head and writing data to said media; and a thermal sensor electrically coupled to said controller for monitoring the enclosure temperature so that a predetermined operation may be executed to compensate the storing operation if the enclosure temperature falls within a predetermined range.

An advantage of the present invention is that it insures that data saved onto a magnetic storage device are properly saved for future retrieval.

Another advantage of the present invention is that it provides a method and apparatus to insure that data to be saved onto a magnetic storage device are correctly saved when the ambient temperature of the storage device is within a predetermined range.

Yet another advantage of the present invention is that it provides a method and apparatus to verify that data saved on a magnetic storage device when the ambient temperature of the storage device is colder than normal operating temperature are retrievable before completing the save operation.

One other advantage of the present invention is that it provides a method and apparatus to insure that data in a track adjacent to a target track of a storage device are unaffected by a write operation to the device when the device ambient temperature is warmer than normal operating temperature.

The foregoing and other objects, features and advantages of the invention will be apparent from the following detailed description of the preferred embodiment which makes reference to the drawings.

IN THE DRAWINGS

FIG. 2A is a diagram showing magnetic track widths written onto a disk at normal operating temperature;

FIG. 2B is a diagram showing magnetic track width of a center track written onto a disk in a warmer than normal ambient temperature environment;

FIG. 2C is a diagram showing magnetic track width of a center track written onto a disk in a cooler than normal ambient temperature environment;

DETAILED DESCRIPTION OF THE PREFERRED EMBODIMENTS

This invention may be implemented using any combination of computer programming software, firmware, or hardware. As a preparatory step to practicing the invention or construction an apparatus according to the invention, the computer programming code, whether in the form of software or firmware, will typically be stored in one or more machine-readable storage devices such as a fixed or hard disk drive, diskettes, optical disks, magnetic tape, or semiconductor memories such as ROM's, PROMs, flash memory, etc., thereby making an article of manufacture according to the invention. The article of manufacture containing the computer programming code is used by either executing the code directly from the storage device, by copying the code from the storage device into another storage device such as a hard disk, RAM, etc., or by transmitting the code on a network for remote execution. The method form of the invention may be practiced by combining one or more machine-readable storage devices containing the code according to the invention with appropriate standard computer hardware to execute the code contained therein. An apparatus for practicing the invention could include one or more computers and storage systems containing or having network access to computer programming code, according to the invention.

Whereas the present invention may be embodied in many forms, details of a preferred embodiment are schematically shown in FIGS. 1 through 8, with the understanding that the present disclosure is not intended to limit the invention to the embodiment illustrated.

Figure 1A:
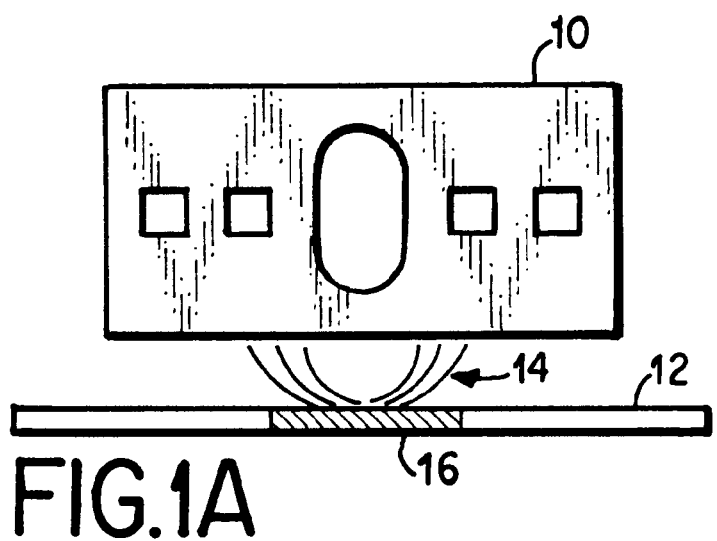
FIG. 1A is a diagram illustrating the effect of disk coercivity on recording data bit width when the device ambient temperature is within a normal operating temperature.
Figure 1B:
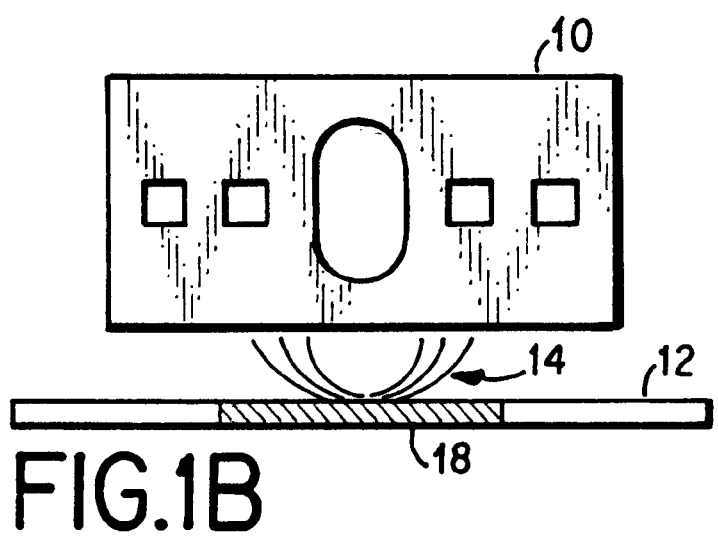
FIG. 1B is a diagram illustrating the effect of disk coercivity on recorded data bit width when the device ambient temperature is at a temperature warmer than normal.
Figure 1C:
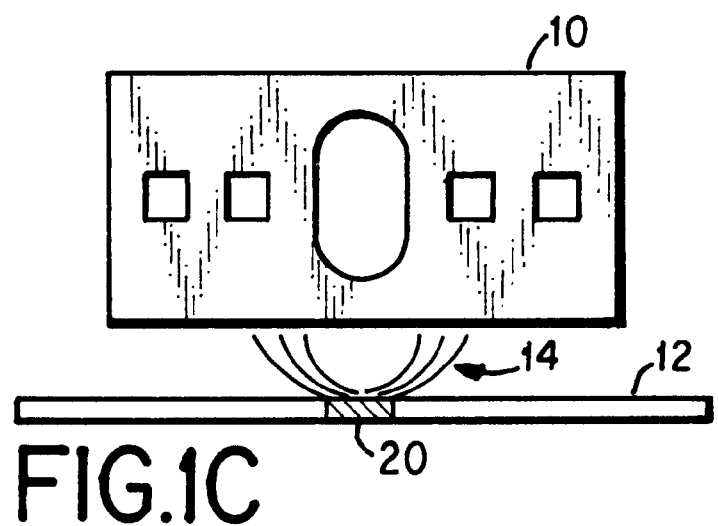
FIG. 1C is a diagram illustrating the effect of disk coercivity on recorded data bit width when the device ambient temperature is at a temperature cooler than normal.
Figure 3:
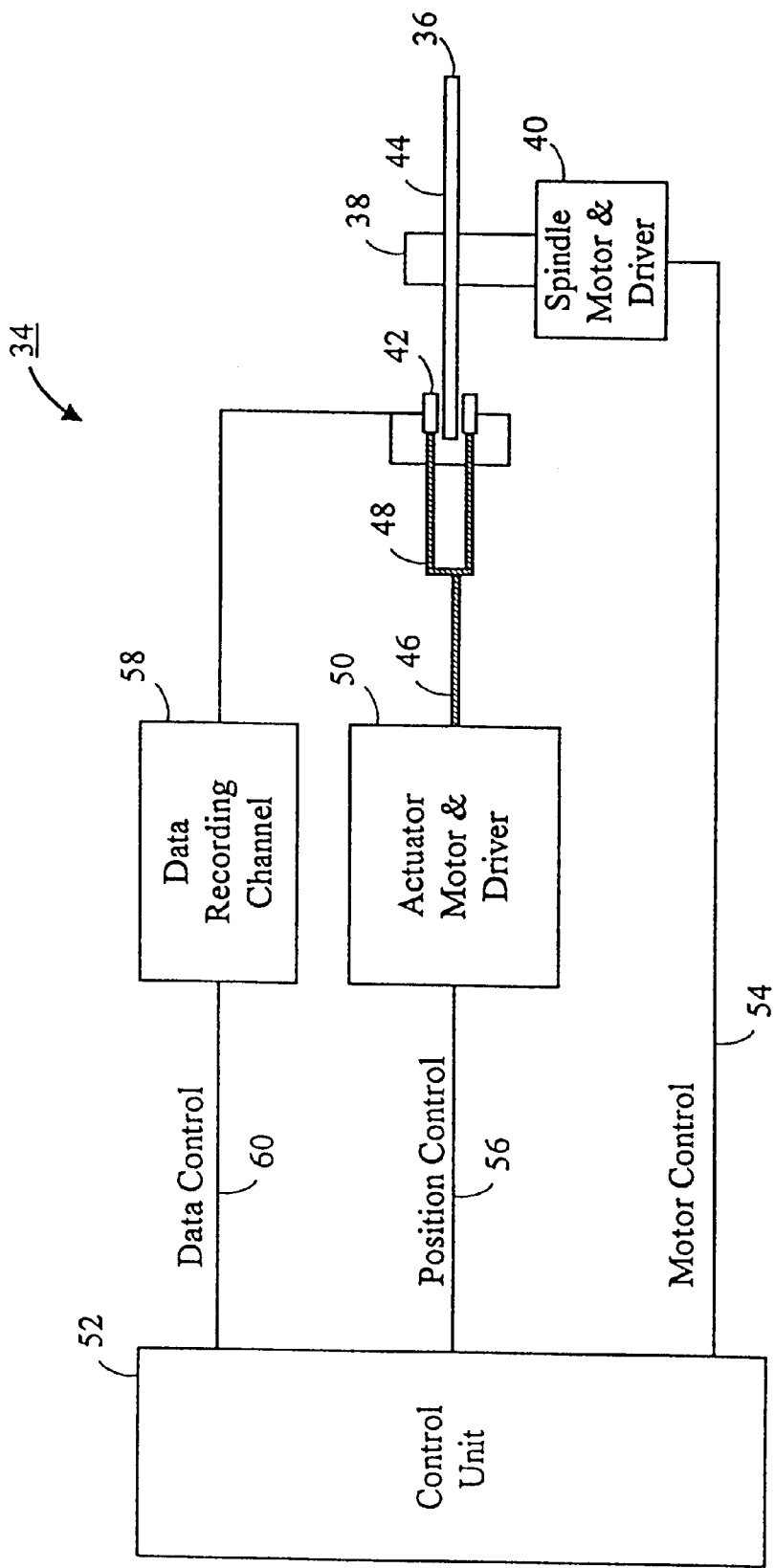
FIG. 3 is a simplified block diagram depicting the principal functional components in a disk drive.

FIG. 3 is a block diagram generally depicting the principal functional blocks in a disk drive 34. As shown, at least one rotatable magnetic disk media 36 is supported on a spindle 38 and rotated by a disk drive motor and associated driver 40. The magnetically recorded data on each disk are in the form of an annular pattern of concentric data tracks, as suggested by FIGS. 2A through 2C, on one or more surfaces of the disk media 28.

The drive includes at least one slider 42 positioned in close proximity to a surface of the disk media 36. Each slider 42 supports one or more magnetic heads (not shown) for writing data to or reading data from the media 36. As the media rotate, slider 42 is moved radially in and out over the media surface 44 so that heads may access different portions (tracks) of the media 36 where data are recorded. Each slider 42 is attached to an actuator arm 46 by means of a suspension 48. The suspension 48 provides a slight spring force which biases slider 42 toward the media surface 44. Each actuator arm 46 is attached to an actuator motor and driver 50 which controls the direction and speed of the actuator movement.

During operation of the recording apparatus, the rotation of the media 36 generates an air bearing between slider 42 and media surface 44 which exerts an upward force or lift on the slider. The air bearing thus counter-balances the slight spring force of suspension 48 and supports slider 42 slightly above the media surface 44 by a small, substantially constant spacing during normal operation. This air bearing can be identified as the space between head 10 and media 12 in FIGS. 1A through 1C.

The various components of the magnetic storage device are controlled in operation by control signals generated by control unit 52, such as access control signals and internal clock signals. Typically, control unit 52 comprises logic control circuits, storage means and a microprocessor; it generates signals such as motor control signals on line 54, head position and seek control signals on line 56 to control various device operations. The head position control signals on line 56 provide the desired current profiles to optimally move and position slider 42 to the desired data track on disk media 36. Read and write signals are communicated to and from the read/write head by means of a data recording channel 58. Data to be read from or written to the device are transferred in response to data control signals on line 60 generated by control unit 52 and data recording channel 58.

This simplified description of a typical magnetic disk storage device and the accompanying illustration of FIG. 3 are for representation purposes only, it being understood that such magnetic storage devices may contain a large number of media and actuators, and each actuator may support a plurality of sliders.

Figure 4:
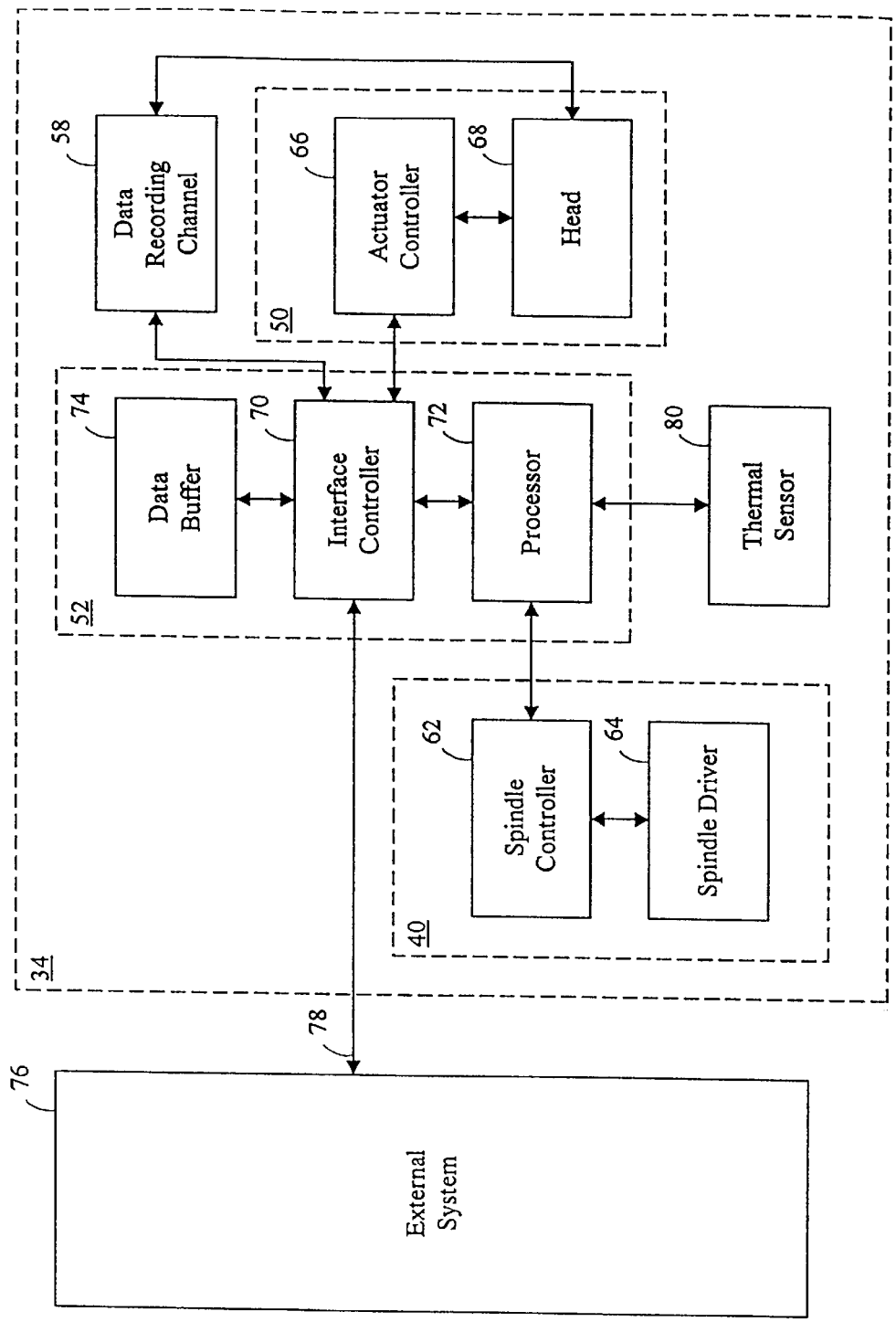
FIG. 4 is a block diagram representing the principal functional blocks of a disk drive suitable for practicing the present invention.

FIG. 4 is a more detailed block diagram showing the functional components of a disk drive system 34 of FIG. 3 suitable for practicing the present invention. As shown in FIG. 3, a disk 36 is rotatably mounted to a spindle 38 which is driven by a spindle motor and driver 40. As shown in FIG. 4, the spindle motor and driver 40 includes a spindle controller 62 and a spindle driver 64. Commutation currents for driving and maintaining a relatively constant speed of rotation of the spindle motor are provided by spindle driver 64, which is under the control of spindle controller 62.

Actuator motor and driver 50 includes an actuator controller 66 and at least one data read/write head 68. Data are saved onto or read from disk via one or more read/write heads 68 which are supported in close proximity to the rotating disk surface. The disk media and head 68 are normally packaged in one enclosure. Each head 68 is electrically coupled to actuator controller 66, which may include a voice coil motor (VCM) comprising a coil movable within a fixed magnetic field. The direction and speed of the coil movements are controlled by the motor current signals supplied by actuator controller 66, which controls the read or write operation of the head 70.

Data recording channel 58, on the one hand, is electrically coupled to an interface controller 70 of the control unit 52, wherein interface controller 70 receives commands from a system 76 external to the disk drive 34 via a disk controller. The external system 76 may, for example, be a computer system. On the other hand, data recording channel 58 is electrically coupled to read/write head 68 for transferring data to be written to or read from the storage media.

Disk drive system 34 stores information on the surfaces of the storage disks in the form of magnetic transitions or patterns formed in a plurality of annular data tracks, as suggested in FIG. 2. In addition to the controller 70, control unit 52 includes a processor 72 and a data buffer 74. The processor controls the data transfers between the data buffer 74 and the data recording logic 58 as well as data transfers between data buffer 74 and external system 76. Disk operations such as read or write typically come from external system 76 via a cable 78, for instance a SCSI or IDE cable. Interface controller 70 sends disk operation commands to processor 72, which monitors the disk enclosure ambient temperature via a thermal sensor 80. After checking the temperature, processor 72 determines whether or not the operation should be executed, and if so, whether or not any particular precaution should be taken to insure that data saved can be successfully read back or that data in the adjacent tracks will not be interfered with. In a write operation, data recording channel 58 sends the data to be saved to the actuator controller 66 which forwards the data to the read/write head 68 where data are written to the magnetic storage media. Similarly, in a read operation, data are sensed or read from the magnetic storage media via the head 68 and passed to actuator controller 66, data recording channel 58, interface controller 70, and on to the external system 76.

Figure 5:
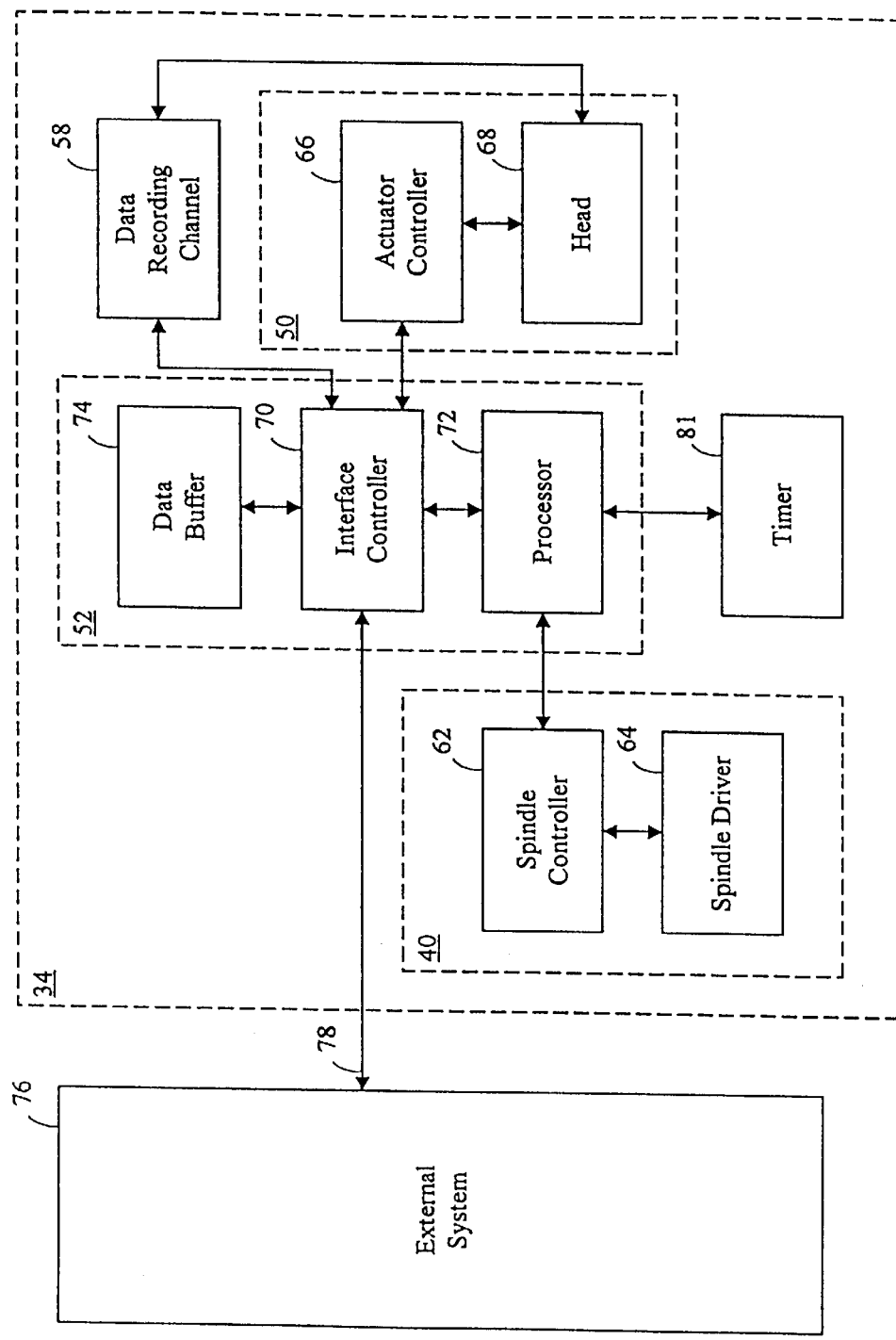
FIG. 5 is a block diagram representing an alternative functional blocks of a disk drive.

FIG. 5 illustrates an alternative embodiment to the disk drive system illustrated in FIG. 4. In this embodiment, a timer 81 is provided in a disk drive system. The timer 81 is electrically coupled to the processor 72, and is controlled and monitored by the processor 72. Timer 81 measures the time duration from the time the power is applied to the disk drive system. Alternatively, the timer 81 also measures the time duration from the time the spindle motor starts after the motor was shut down. A special write operation is executed if the time duration has not reached a predetermined interval to ensure that a write to the device will not cause problems in a subsequent read operation.

Figure 6:
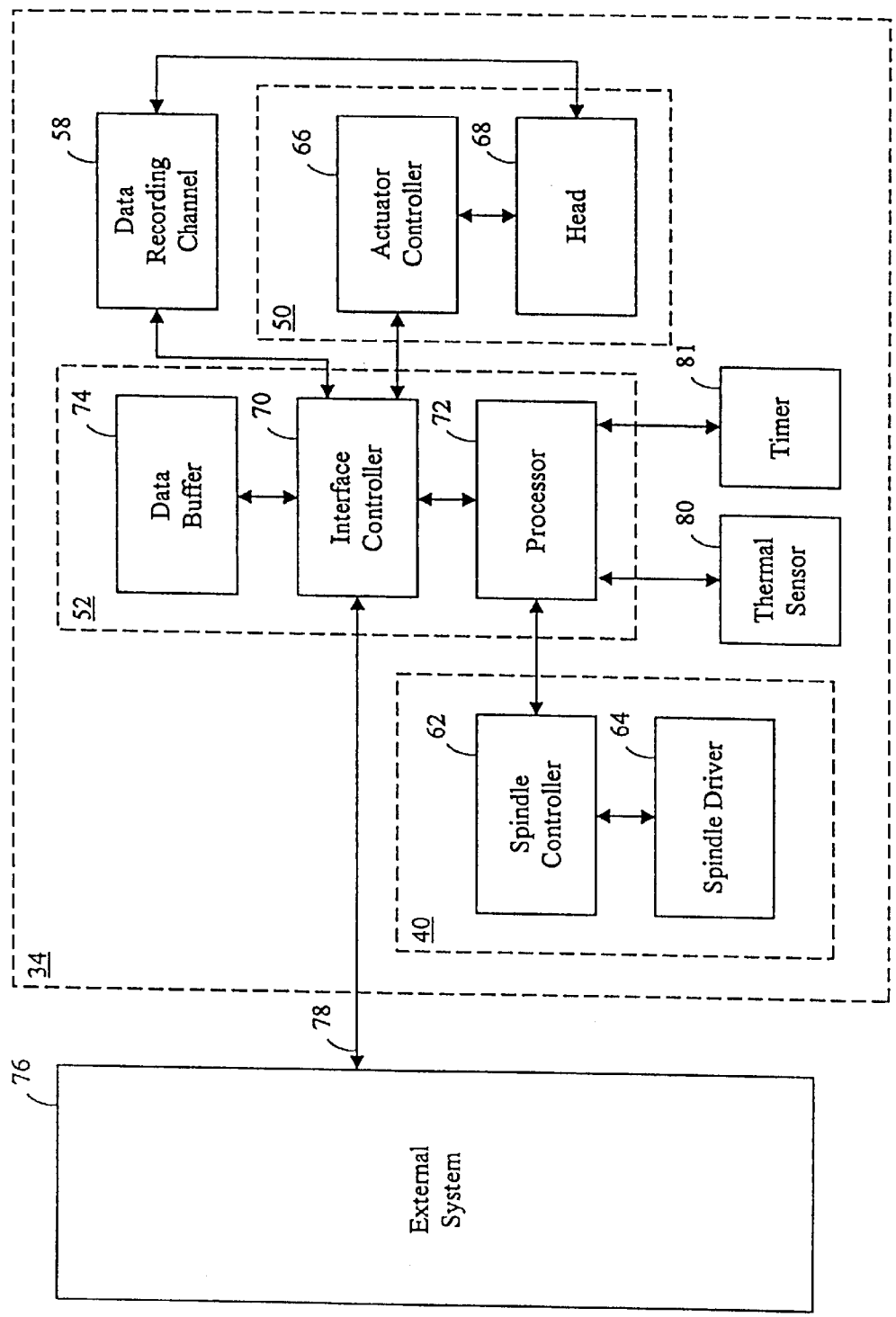
FIG. 6 is a block diagram represent another alternative functional blocks of a disk drive suitable for practicing the present invention.

FIG. 6 illustrates another alternative to the disk drive system illustrated in FIG. 4. In this embodiment, a thermal sensor 80 as well as a timer 81 are provided. Both the thermal sensor 80 and timer 81 are electrically coupled to the processor 72. Both thermal sensor 80 and timer 81 provide references to the processor 72 when writing data to the device.

Figure 7:
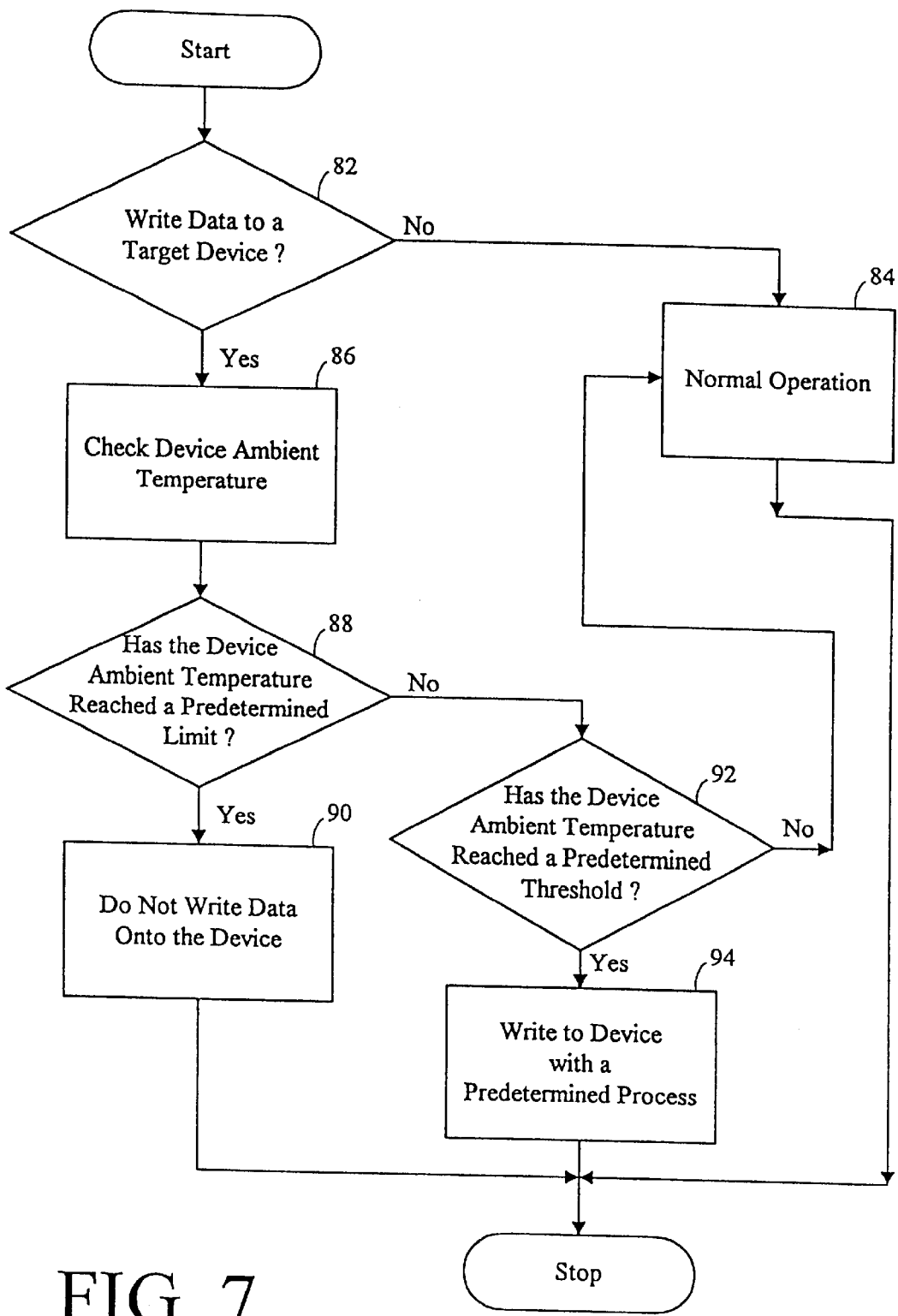
FIG. 7 is a flow diagram illustrating a process of determining whether or not the ambient temperature of a storage device is within a particular range, and if so how, data are to be written to the device.

FIG. 7 is a flow diagram illustrating the process executed by processor 72 in determining whether or not the ambient temperature of the storage device is within a particular range, and if so, how data are to be written to the device. The computer programming codes for carrying out the operation may be stored in memory embedded in the processor or in memory devices coupled to the processor for execution. The process starts with checking the task command issued to the target storage device to determine whether or not it is a write operation (block 82). If the operation does not involve a write to the device, then the operation proceeds with its normal operation (block 84), which means no particular precaution is required in executing the command. If the command relates to a write to the device, then the next task is to check the ambient temperature of the read/write head or disk enclosure (block 86). After obtaining the disk or head enclosure ambient temperature, the next task is to determine whether or not the temperature has reached a limit where write to disk is prohibited (block 88). The limit may either be a low temperature where data bits written to the disk will be so narrow that data are unlikely to be successfully retrieved, or it may be so high that a write to the target track is bound to squeeze into its adjacent tracks and cause unrecoverable hard error in a subsequent read to the adjacent tracks. Under these circumstances, the write operation is prohibited and data are not written to the device (block 90). In the low-temperature scenario the limit may be approximately 5° C., whereas in the high-temperature scenario the limit may be approximately 65° C. If the ambient temperature has not reached the limit, then it is necessary to find out whether or not the temperature has reached a predetermined threshold (block 92). If the temperature has reached the threshold, it is essential that the write operation be performed with a predetermined process (block 94) to assure that the data saved will not cause any hard errors in a subsequent read operation. In the presently preferred embodiment, one threshold is set at the low end of the operational temperature range and another is set at the high end of the temperature range. In the low temperature situation, the "low threshold" temperature may be set to be a few degrees higher than the "low limit" temperature, such as at approximately 15° C. In the high temperature condition, the "high threshold" temperature may be set be at a temperature that is a few degrees lower than the "high limit" temperature, for instance, at approximately 60° C. Between the "low threshold" temperature and the "high threshold" temperature is the temperature range for normal operation.

Figure 8:
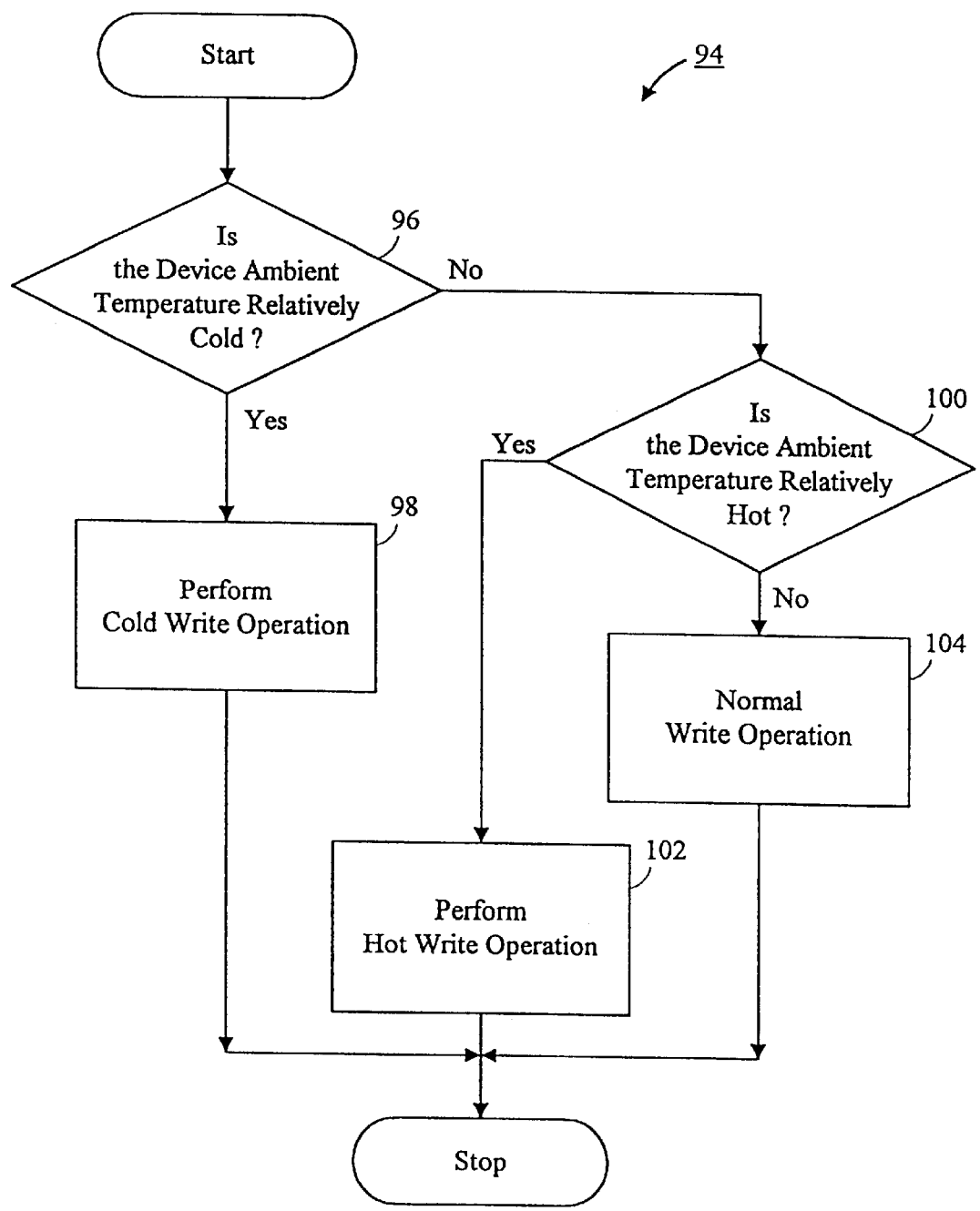
FIG. 8 is a flow diagram illustrating the process of determining whether or not to trigger a cold-write operation or a warm-write operation.

After determining that writing to the disk should be performed with safeguard against future unrecoverable read error because the ambient temperature is outside the normal operating range but inside the high or low limits, the next step (block 94) is to determine whether the write operation should be performed in accordance with a predetermined cold process or a predetermined hot process. Hence, as illustrated in FIG. 8, the next task is to determine whether or not the device ambient temperature is relatively cold (block 96), i.e., between the "low limit" and the "low threshold" temperature; if so, then a cold-write operation is to be performed (block 98); otherwise, a check must be made as to whether or not the ambient temperature is relatively hot (block 100), i.e., between the "high limit" and the "high threshold" temperature; if so, then a hot-write operation will be performed (block 102). If the device ambient temperature is neither hot nor cold then the normal write operation (block 104) will be executed because the ambient temperature fails within the normal operating range.

Figure 9:
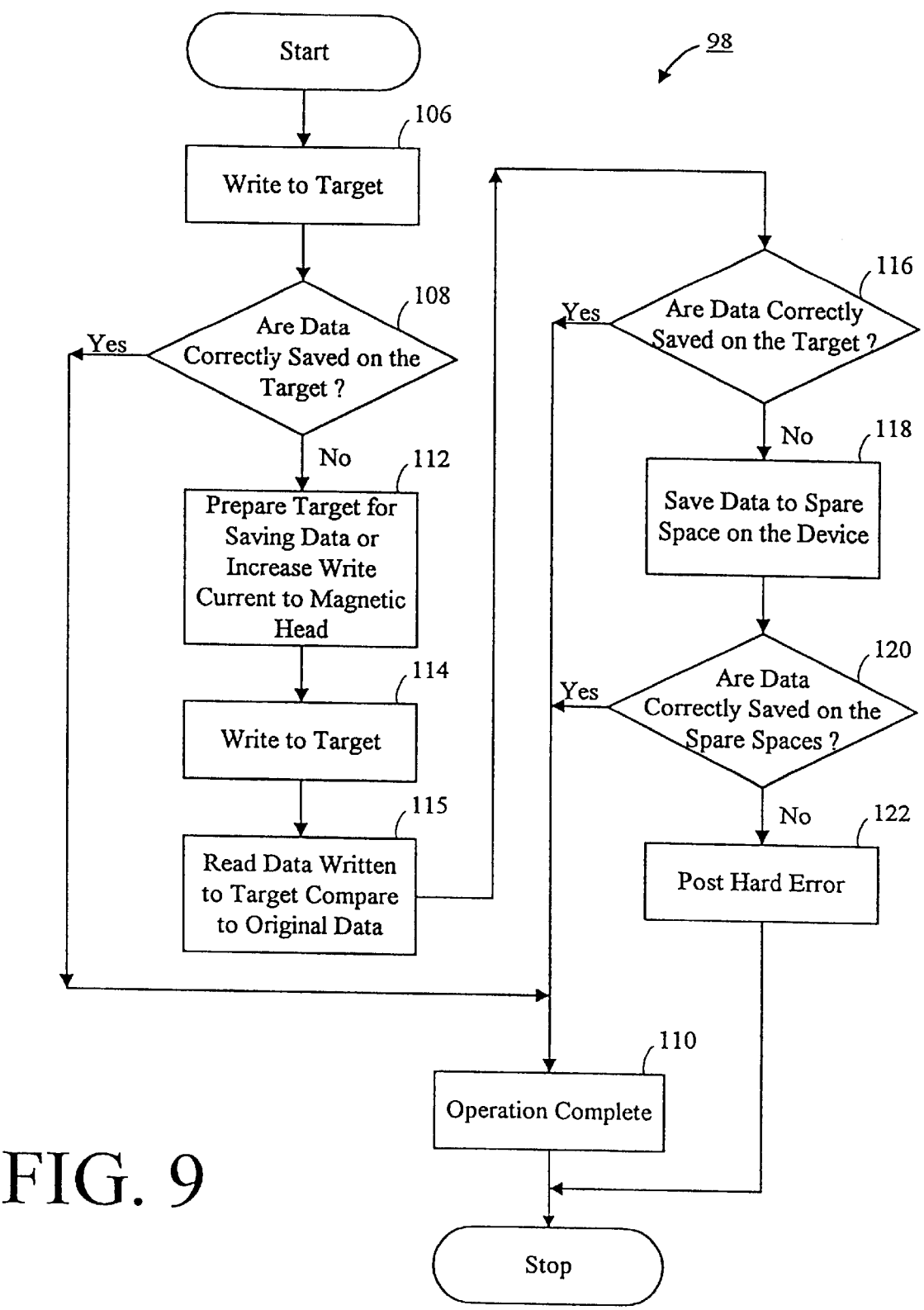
FIG. 9 is a flow diagram illustrating the process of writing data onto a storage device in a cold temperature environment.

If it is determined that the disk is too cold for normal operation, i.e., the disk ambient temperature is between the "low threshold" and "low limit," a special cold-write operation will be triggered. FIG. 9 is a flow diagram illustrating the special process (block 98 in FIG. 8) of writing data to a storage device in the cold temperature situation. The operation starts with writing to the target device (block 106) first and verifying (block 108) whether or not the data have been correctly saved on the target device. The operation is completed (block 110) if the data have been correctly saved on the storage device. It is essential that the target device be prepared to write data in a cold environment if the data are not correctly saved on the target device. One way to prepare the target device under this circumstance is to increase the write current to the magnetic read/write head (block 112) for writing data to the device. Another way to prepare the target device for writing data in a cold environment is to ensure that preexisting data in the target track are properly erased before writing to the device. This can be accomplished by performing erasures to the target track at small positive and negative fractional track offsets prior to writing the data in the middle of the target track. This prevents the previously stored data that are not completely erased from interfering with the read subsequent to a narrow write in the relatively cold environment. Because a narrow write may not erase the remnants of the previous data on both edges of the track, the remnants may confuse the read element subsequent to the narrow write. After the target device is prepared for writing data, the next process is actually to write data to the device (block 114) and read the data written to the target and compare to original data to be written (block 115) to determine (block 116) whether or not the data have been correctly saved on the device. The operation is complete if the data are correctly saved on the device; that is, the data are read back from the device and correctly compared to the data to be saved. If the data are not correctly saved on the device, then the data are written to a previously reserved spare space on the device (block 118) and verified (block 120) against the data to be saved. The spare space can be selected on a storage medium having a head/disk combination with the best write parametrics. The operation is completed (block 110) if the data can be correctly saved to the spare space on the device; otherwise a hard error will be posted (block 122) to advise the user that the write operation failed. The user may try to write the data onto another device before overwriting the data if all attempts to write data to the target device in the cold environment fail.

The above-described cold-write operation may also be performed without monitoring the device ambient temperature. When properly writing data to the device may still be problematic because the device ambient temperature is relatively cold, another alternative is to use a timer in measuring the time during after powering up the device or starting the spindle motor. This alternative is especially valuable if the device is not equipped with a temperature sensor. The operation checks whether or not the device has operated for a predetermined period of time and executes the above-described cold-write operation if it has not. Yet another alternative is to use the timer to improve the write operation performance even if the device is equipped with a temperature sensor. In this alternative the device ambient temperature is checked after a predetermined period of time. This reduces the necessity of frequently checking ambient temperature and improves the write performance.

Figure 10:
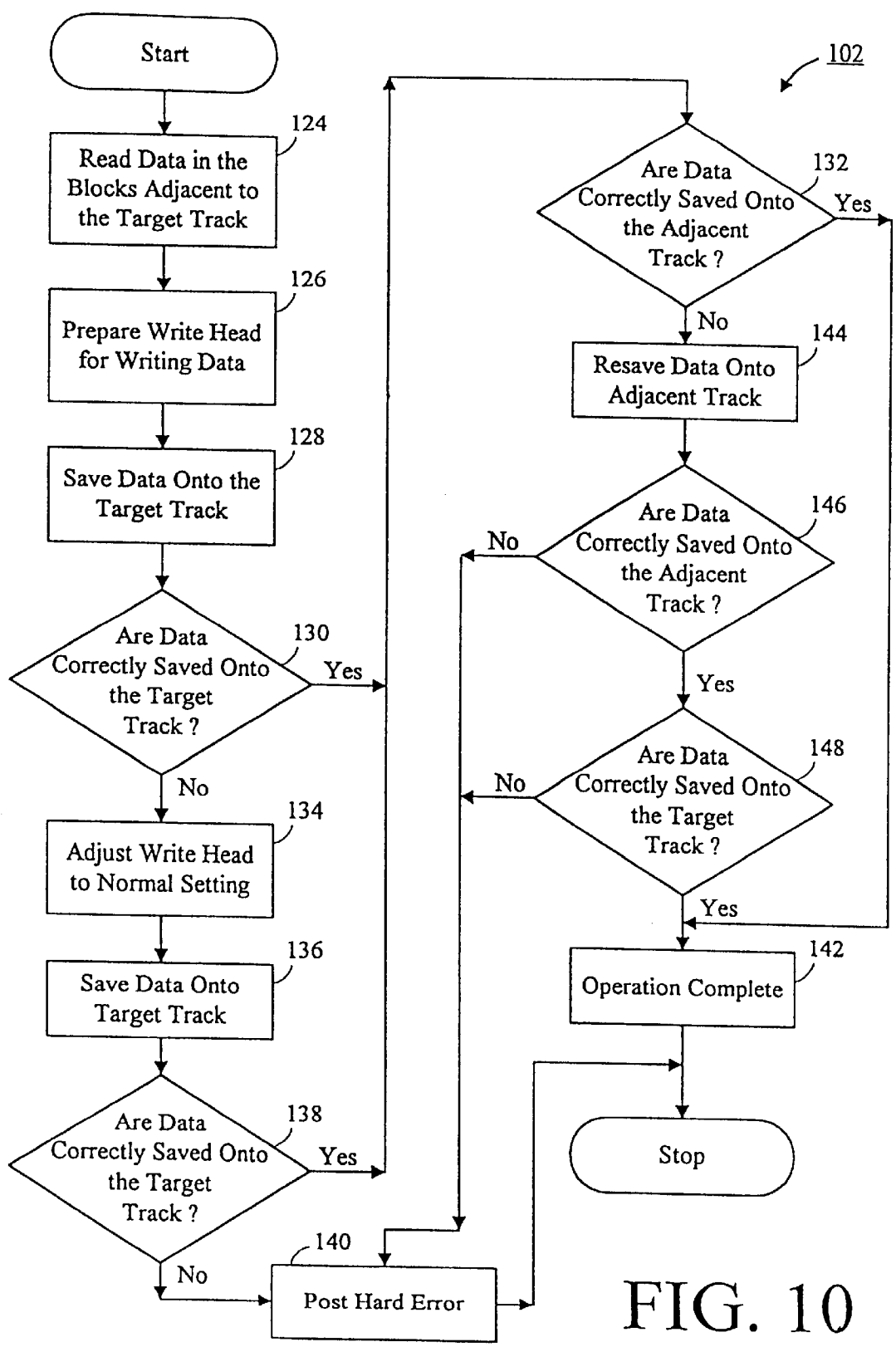
FIG. 10 is a flow diagram illustrating the process of writing data onto a storage device in a warm temperature environment.

If it is determined at step 102 (FIG. 8) that the disk is too warm for normal operation, i.e., when the disk ambient temperature is between the high threshold and the high limit, a special hot-write operation will be performed. FIG. 10 is a flow diagram illustrating the process of saving data onto a storage device in a hot temperature environment. In the hot-write operation, the data in the track or tracks adjacent to the target track are first read and preserved (block 124) before any attempt is made to write to the device. In order to avoid squeezing into the adjacent tracks, the write head is prepared (block 126) for writing data in a warm environment, such as reducing the write current applied to the magnetic head before writing to the target device (block 128). After the data have been saved to the device, they are read back and verified against the data to be saved to confirm that they are correctly saved in the target track (block 130). If the data are correctly saved, then the operation will proceed to check whether or not the data in the adjacent track or tracks still contain the previously saved data (block 132). If the data are not correctly saved in the target track, then the write head is adjusted back to its normal setting (block 134), such as adjusting the write current to its normal setting and the data will be rewritten to the same target track again (block 136). After writing the data to the device, the data are read back and verified (block 138) to determine whether or not the data are correctly saved on the target track. A hard error will be returned (block 140) from the write operation if the data are not correctly saved on the target track. If the data are correctly saved on the target track, then the data in the adjacent tracks will be verified (block 132) against their original data previously read from the device to check whether or not the data in the adjacent track have been altered or destroyed by the write performed on the target track. The operation is completed successfully (block 142) if the data in the adjacent tracks are still intact after writing to the target track. If the data in the tracks adjacent the target track have been negatively influenced with by the write applied to the target track (block 144), then the data in the adjacent tracks previously read are rewritten onto the respective adjacent tracks. After the previously read data are written back into the adjacent tracks, the data in the adjacent tracks are verified (block 146) for their correctness. If the verification indicates that the data in the adjacent tracks are not the same as their previous data, then a hard error is posted (block 140) to warn the user of such an error. If the data in the tracks adjacent to the target track are correctly verified, then data in the target track are verified again (block 148) to confirm that all the data in the target track have not been altered or destroyed by the write performed on its adjacent tracks. If the data in the target track are still correctly saved in the target track, then the operation is completed successfully (block 142).

One other alternative embodiment to reducing the write current described above is to tighten the threshold of the servo write-inhibit criterion. Servo write-inhibit prevents writing operations for one revolution of the media rotation when the servo system in the device determines that the read/write head has veered too far off track. The head tracking must be within a predetermined range of its aligned position before writing to the device is permitted. When the head is writing extra-wide in a relatively warm environment, the predetermined range must be adjusted to tighten the threshold to narrow the range of head deviation from it aligned position. The tolerance of head deviation will be adjusted to below its normal value to ensure that the writing to the media is within a predetermined range of its aligned head position.

While the invention has been particularly shown and described with reference to certain embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A method for storing data on a target track of a recordable medium in a storage device via a magnetic write head therein, said storage device having an operating parameter falling within an operational range having a first extreme at which the writing of data to said device is prohibited, and wherein a first threshold within said range is defined and proximate said first extreme and delimiting a first operational subrange, comprising the steps of:

monitoring said operating parameter; and
   determining whether the monitored parameter lies within said first subrange and if so, performing a first predetermined operation to compensate for deleterious effects on data storage caused thereby, wherein said first predetermined operation includes the steps of:
   writing data to said storage device;
   verifying the correctness of said data written on said storage device; and
   completing the data storing operation if said data are correctly saved in said storage device; and
   wherein said first predetermined operation further includes the following steps if said data are not correctly saved in said storage device:
   preparing said storage device for writing data;
   rewriting data to said storage device;
   verifying the correctness of said rewritten data; and
   completing the data storing operation if said data are correctly resaved in said storage device.

2. A method for storing data as recited in claim 1, wherein said first predetermined operation further includes the following steps if said data are not correctly resaved in said storage device:
   writing data to a spare space on said storage device;
   verifying the correctness of said data written in the spare space; and
   returning error status if said data are not correctly saved in said storage device or completing the data storing operation if said data are correctly saved in said storage device.

3. A method for storing data as recited in claim 1, wherein said preparing said storage device for writing data includes increasing write current to a magnetic head of said storage device.

4. A method for storing data as recited in claim 1, wherein said preparing said storage device for writing data includes erasing preexisting data with fractional track offsets.

5. A method for storing data as recited in claim 4, wherein said operating parameter is a range of ambient temperatures and said first threshold is a predetermined temperature within said range, and said first threshold temperature is approximately 15° C.

6. A method for storing data on a target track of a recordable medium in a storage device via a magnetic write head therein, said storage device having an operating parameter falling within an operational range having a first extreme at which the writing of data to said device is prohibited, and wherein a first threshold within said range is defined and proximate said first extreme and delimiting a first operational subrange, comprising the steps of:

monitoring said operating parameter; and
   determining whether the monitored parameter lies within said first subrange and if so, performing a first predetermined operation to compensate for deleterious effects on data storage caused thereby; wherein said first predetermined operation includes the steps of:
   retrieving data in tracks adjacent to the target track;
   preparing said write head and writing data to the target track of said storage device;
   verifying the correctness of said data written on the target track, and further including the following steps if said data are not correctly stored on the target track:
   adjusting said write head to its normal setting;
   writing the data to the target track; and
   verifying the correctness of the data written on the target track and returning error status if the data are not correctly saved;
   verifying the correctness of the data in the adjacent tracks, and rewriting the data to the adjacent tracks if they are not correctly saved and verifying the correctness of the data in the adjacent tracks after being rewritten; and
   returning error status if data in the adjacent tracks are not correctly saved, otherwise returning a completion status if data in the adjacent tracks are correctly stored.

7. A method for storing data as recited in claim 6, wherein said preparing said write head includes reducing write current to said head from its normal setting.

8. A method for storing data as recited in claim 6, wherein said adjusting said write head to its normal setting includes increasing write current to said head to its normal setting.

9. A method for storing data as recited in claim 6, wherein said preparing said write head includes tightening servo write-inhibit criterion.

10. A method for storing data as recited in claim 6, wherein said adjusting said write head to its normal setting includes adjusting servo write-inhibit criterion to its normal setting.

11. A method for storing data as recited in claim 6, wherein said operating parameter is a range of ambient temperatures and said first threshold is a predetermined temperature within said range, and said first threshold temperature is approximately 60° C.

12. A method for storing data on a target track of a recordable medium in a storage device via a magnetic write head therein, said storage device having an operating parameter falling within an operational range having a first extreme at which the writing of data to said device is prohibited, and wherein a first threshold within said range is defined and proximate said first extreme and delimiting a first operational subrange, comprising the steps of:

monitoring said operating parameter; and determining whether the monitored parameter lies within said first subrange and if so, performing a first predetermined operation to compensate for deleterious effects on data storage caused thereby; wherein said first predetermined operation comprises the steps of:

writing data to said storage device;

verifying the correctness of said data written on said storage device; and completing the data storing operation if said data are correctly saved in said storage device; and wherein said operating parameter is a range of ambient temperatures and said first threshold is a predetermined temperature within said range, and wherein said second predetermined operation includes the steps of:

retrieving data in tracks adjacent to the target track;

preparing said write head and writing data to the target track of said storage device;

verifying the correctness of said data written on the target track, and further including the following steps if said data are not correctly stored on the target track:

adjusting said write head to its normal setting;

writing the data to the target track; and verifying the correctness of the data written on the target track and returning error status if the data are not correctly saved;

verifying the correctness of the data in the adjacent tracks, and rewriting the data to the adjacent tracks if they are not correctly saved and verifying the correctness of the data in the adjacent tracks after being rewritten; and returning error status if data in the adjacent tracks are not correctly saved, otherwise returning a completion status if data in the adjacent tracks are correctly stored.

13. A method for storing data as recited in claim 12, wherein said first threshold temperature is approximately 60° C.

14. A computer program product embodying a program of instructions executable by a machine to perform method steps for storing data on a target track of a recordable medium in a storage device via a magnetic write head therein, said storage device having an operating parameter having an operational range with a first extreme at which the writing of data to said storage device is prohibited, and wherein a first threshold within said range is defined and proximate said first extreme and delimiting a first operational subrange, said product being operative to execute a method comprising the steps of:

monitoring said operating parameter; and determining whether the monitored parameter lies within said first subrange and if so, performing a first predetermined operation to compensate for deleterious effects on data storage caused thereby; wherein said first predetermined operation includes the steps of:

writing data to said storage device;

verifying the correctness of said data written on said storage device; and completing the data storing operation if said data are correctly saved in said storage device, and wherein said first predetermined operation further includes the following steps if said data are not correctly saved in said storage device:

preparing said storage device for writing data;

rewriting data to said storage device;

verifying the correctness of said rewritten data; and completing the data storing operation if said data are correctly resaved in said storage device.

15. A computer program product as recited in 14 wherein said first predetermined operation further includes the following steps if said data are not correctly resaved in said storage device:

writing data to a spare space on said storage device;

verifying the correctness of said data written in the spare space; and returning error status if the data are not correctly resaved in said storage device or completing the data storing operation if said data are correctly saved in device.

16. A computer program product as recited in claim 14 wherein said preparing said storage device for writing data includes increasing write current to a magnetic head of said storage device.

17. A computer program product as recited in claim 14 wherein said preparing said storage for writing data includes erasing preexisting data with fractional track offsets.

18. A computer program product as recited in claim 17 wherein said operating parameter is a range of ambient temperatures and said first threshold is a predetermined temperature within said range, and said first threshold temperature is approximately 15° C.

19. A computer program product embodying a program of instructions executable by a machine to perform method steps for storing data on a target track of a recordable medium in a storage device via a magnetic write head therein, said storage device having an operating parameter having an operational range with a first extreme at which the writing of data to said storage device is prohibited, and wherein a first threshold within said range is defined and proximate said first extreme and delimiting a first operational subrange, said product being operative to execute a method comprising the steps of:

monitoring said operating parameter; and determining whether the monitored parameter lies within said first subrange and if so, performing a first predetermined operation to compensate for deleterious effects on data storage caused thereby, and wherein said first predetermined operation comprises the steps of:

retrieving data in tracks adjacent to the target track;

preparing said write head and writing data to the target track of said storage device;

verifying the correctness of said data written on the target track, and further including the following steps if said data are not correctly stored on the target track:

adjusting said write head to its normal setting;

writing the data to the target track; and verifying the correctness of the data written on the target track and returning error status if the data are not correctly saved;

verifying the correctness of the data in the adjacent tracks, and rewriting the data to the adjacent tracks if they are not correctly saved and verifying the correctness of the data in the adjacent tracks after being rewritten; and returning error status if data i the adjacent tracks are not correctly saved, otherwise returning a completion status if data in the adjacent tracks are correctly stored.

20. A computer program product as recited in claim 19, wherein said preparing said write head includes reducing write current to said head from its normal setting.

21. A computer program product as recited in claim 19, wherein said adjusting said write head to its normal setting includes increasing write current to said head to its normal setting.

22. A computer program product as recited in claim 19, wherein said preparing said write head includes tightening servo write-inhibit criterion.

23. A computer program product as recited in claim 19, wherein said adjusting said write head to its normal setting includes adjusting servo write-inhibit criterion to its normal setting.

24. A computer program product as recited in claim 19, wherein said operating parameter is a range of ambient temperatures and said first threshold is a predetermined temperature within said range, and said first threshold temperature is approximately 60° C.

25. A computer program product embodying a program of instructions executable by a machine to perform method steps for storing data on a target track of a recordable medium in a storage device via a magnetic write head therein, said storage device having an operating parameter having an operational range with a first extreme at which the writing of data to said storage device is prohibited, and wherein a first threshold within said range is defined and proximate said first extreme and delimiting a first operational subrange, said product being operative to execute a method comprising the steps of:

monitoring said operating parameter; and determining whether the monitored parameter lies within said first subrange and if so, performing a first predetermined operation to compensate for deleterious effects on data storage caused thereby, wherein said operating parameter is a range of ambient temperatures and said first threshold is a predetermined temperature within said range, wherein the operating range is defined at a second extreme by a second temperature limit within said range at which writing of data to said device is prohibited, and wherein a second threshold temperature within said range is defined and proximate said second temperature limit and delimits a second operational temperature subrange, further including the steps of:

determining whether the ambient temperature lies between said second subrange and if so, performing a second predetermined operation to compensate for deleterious effects on data storage caused by the ambient temperature, and wherein said second predetermined operation includes the steps of:

retrieving data in a track adjacent to the target track;

reducing write current to a magnetic head of said storage device from its normal setting, and writing the data to the target track of said storage device;

verifying the correctness of said data written on the target track, and further including the following steps if said data are not correctly stored on the target track:

adjusting write current to the head to its normal setting;

writing the data to the target track; and verifying the correctness of the data written on the target track and returning error status if the data are not correctly saved;

verifying the correctness of the data in the adjacent track, and rewriting the data to the adjacent track if they are not correctly saved and verifying the correctness of the data in the adjacent track after being rewritten; and returning error status if data in the adjacent track are not correctly saved, otherwise returning a completion status if data in the adjacent track are correctly stored.

26. A computer program product as recited in claim 25 wherein said first threshold temperature is approximately 60° C.

27. A disk drive system having a magnetic write head and a magnetic storage medium for storing data in a storage device, wherein said head and said storage medium are packaged in an enclosure, said system having an operating temperature range defined at one extreme by a first temperature limit at which the writing of data to said storage medium is prohibited, and a first threshold temperature within said range is defined and proximate said first temperature limit and delimits a first operational temperature subrange, comprising:

a controller for interfacing with an external system and controlling operation of the disk drive system;

an actuator driver electrically coupled to said controller for positioning said head and writing data to said storage medium; and a thermal sensor electrically coupled to said controller for monitoring the enclosure temperature wherein a first predetermined operation is executed to temperature compensate the storing operation, and wherein said first predetermined operation includes the steps of:

writing data to said storage device;

verifying the correctness of said data written on said storage device; and completing the data storing operation if said data are correctly saved in said storage device, and wherein said first predetermined operation further includes the following steps if said data are not correctly saved in said storage device:

preparing said storage device for writing data;

rewriting data to said storage device;

verifying the correctness of said rewritten data; and completing the data storing operation if said data are correctly resaved in said storage device.

28. A disk drive system as recited in claim 27, wherein said first predetermined operation further includes the following steps if said data are not correctly resaved in said storage device:

writing data to a spare space on said storage device;

verifying the correctness of said data written in the spare space; and returning error status if said data are not correctly saved in said storage device or completing the data storing operation if said data are correctly saved in said storage device.

29. A disk drive system as recited in claim 27, wherein said preparing said storage device for writing data includes increasing write current to a magnetic head of said device.

30. A disk drive system as recited in claim 27, wherein said preparing said storage for writing data includes erasing preexisting data with fractional track offsets.

31. A disk drive system having a magnetic write head and a magnetic storage medium for storing data in a storage device, wherein said head and said storage medium are packaged in an enclosure, said system having an operating temperature range defined at one extreme by a first temperature limit at which the writing of data to said storage medium is prohibited, and a first threshold temperature within said range is defined and proximate said first temperature limit and delimits a first operational temperature subrange, comprising:

controller for interfacing with an external system and controlling operation of the disk drive system;

an actuator driver electrically coupled to said controller for positioning said head and writing data to said storage medium; and a thermal sensor electrically coupled to said controller for monitoring the enclosure temperature wherein an operation including the following steps is executed to temperature compensate the storing operation:

receiving the ambient temperature of said storage device; and determining whether the ambient temperature lies within said first subrange and if so, performing a first predetermined operation to compensate for deleterious effects on data storage caused by the ambient temperature, and wherein said first predetermined operation includes the steps of:

retrieving data in tracks adjacent to the target track;

preparing said write head and writing data to the target track of said storage device;

verifying the correctness of said data written on the target track, and further including the following steps if said data are not correctly stored on the target track:

adjusting said write head to its normal setting;

writing the data to the target track; and verifying the correctness of the data written on the target track and returning error status if the data are not correctly saved;

verifying the correctness of the data in the adjacent tracks, and rewriting the data to the adjacent tracks if they are not correctly saved and verifying the correctness of the data in the adjacent tracks after being rewritten; and returning error status if data in the adjacent tracks are not correctly saved, otherwise returning a completion status if data in the adjacent tracks are correctly stored.

32. A disk drive system as recited in claim 31, wherein said preparing said write head includes reducing write current to said head from its normal setting.

33. A disk drive system as recited in claim 31, wherein said adjusting said write head to its normal setting includes increasing write current to said head to its normal setting.

34. A disk drive system as recited in claim 31, wherein said preparing said write head includes tightening servo write-inhibit criterion.

35. A disk drive system as recited in claim 31, wherein said adjusting said write head to its normal setting includes adjusting servo write-inhibit criterion to its normal setting.

36. A disk drive system having a magnetic write head and a magnetic storage medium for storing data in a storage device, wherein said head and said storage medium are packaged in an enclosure, said system having an operating temperature range defined at one extreme by a first temperature limit at which the writing of data to said storage medium is prohibited, and a first threshold temperature within said range is defined and proximate said first temperature limit and delimits a first operational temperature subrange, comprising:

a controller for interfacing with an external system and controlling operation of the disk drive system;

an actuator driver electrically coupled to said controller for positioning said head and writing data to said storage medium; and a thermal sensor electrically coupled to said controller for monitoring the enclosure temperature wherein an operation including the following steps is executed to temperature compensate the storing operation:

receiving the ambient temperature of said storage device; and determining whether the ambient temperature lies within said first subrange and if so, performing a first predetermined operation to compensate for deleterious effects on data storage caused by the ambient temperature, wherein the operating range is defined at a second extreme by a second temperature limit at which writing of data to said storage device is prohibited, and a first threshold temperature within said range is defined and proximate said first temperature limit and delimits a first operational temperature subrange, further including the steps of:

determining whether the ambient temperature lies within said second subrange and if so, performing a second predetermined operation to compensate for deleterious effects on data storage caused by the ambient temperature, and wherein said second predetermined operation includes the steps of:

retrieving data in tracks adjacent to the target track;

preparing said write head and writing data to the target track of said storage device;

verifying the correctness of said data written on the target track, and further including the following steps if said data are not correctly stored on the target track:

adjusting said write head to its normal setting;

writing the data to the target track; and verifying the correctness of the data written on the target track and returning error status if the data are not correctly saved;

verifying the correctness of the data in the adjacent tracks, and rewriting the data to the adjacent tracks if they are not correctly saved and verifying the correctness of the data in the adjacent tracks after being rewritten; and returning error status if data in the adjacent tracks are not correctly saved, otherwise returning a completion status if data in the adjacent tracks are correctly stored.

* * * * *